April 12, 1966    K. M. RICHARDSON    3,245,201
ALIGNING DEVICE
Filed Oct. 22, 1962    5 Sheets-Sheet 1

INVENTOR.
KARL M. RICHARDSON
BY Woodling & Krost
Atty's.

April 12, 1966 K. M. RICHARDSON 3,245,201
ALIGNING DEVICE
Filed Oct. 22, 1962 5 Sheets-Sheet 2

INVENTOR.
KARL M. RICHARDSON
BY Woodling & Krost
attys.

April 12, 1966     K. M. RICHARDSON     3,245,201
ALIGNING DEVICE Filed Oct. 22, 1962     5 Sheets-Sheet 3

INVENTOR.
KARL M. RICHARDSON
BY Woodling & Krost
ATTORNEYS

April 12, 1966     K. M. RICHARDSON     3,245,201
ALIGNING DEVICE Filed Oct. 22, 1962     5 Sheets-Sheet 4

INVENTOR.
KARL M. RICHARDSON

United States Patent Office 3,245,201
Patented Apr. 12, 1966

3,245,201
ALIGNING DEVICE
Karl M. Richardson, P.O. Box 1514, Minot, N. Dak.
Filed Oct. 22, 1962, Ser. No. 233,184
17 Claims. (Cl. 33—180)

This application is a continuation-in-part of my application Serial No. 850,493 filed November 2, 1959, now abandoned, for aligning device which in turn was a continuation-in-part of my application Serial No. 610,319 filed September 17, 1956, for aligning device, now abandoned.

The invention relates in general to a device for aligning members with respect to each other and more particularly to a device for aligning two pieces of pipe at a predetermined angle with respect to each other which device has bypass wall means for bypassing a fitting between the pieces of pipe.

In the fabrication of welded pipe, the present method of aligning pipe and the various pipe fittings, such as elbows, T's, flanges, and reducers which are to be connected by welding each to the other is rather awkward and inaccurate. At the present time, the steel square and the carpenter's level are used for aligning pipe and fittings. The present device is designed to replace the carpenter's square and in many instances, the level. This device will enable the mechanic to fit the pieces of pipe and fittings in all phases of fabrication for which it is designed as will be explained in the forthcoming description and illustrated in the accompanying drawings.

The basic form of the aligning device includes two sides that may be adjusted to varying angular relationships with respect to each other, these two sides being joined by interconnecting means or an interconnecting member having wall means which displaces the mechanical vertex of the angle so as to bypass the inside corner of the angle, and as a consequence, bypass the fitting or bend which is to interconnect two pieces of pipe. This aligning device progresses from a basic construction to various adjustments and adaptations as will be hereinafter fully set forth. The present aligning device is peculiarly adapted to square up and align the bolt holes in a flange with respect to a point on the circumference of a length of pipe to which it is to be subsequently interconnected. The device is also adapted to determine various angular positions about the circumference of a piece of pipe with respect to a vertical plane.

An object of the invention is to provide an aligning device having side members with wall or surface means to engage respective pipe components which components have been or are to be connected by connection means, and having interconnecting means connecting the side members together which interconnecting means has wall means to bypass the connection means.

Another object is to provide an aligning device having pivot means interconnecting two side members with a unique means of securing and varying the angular relationship between the side members.

Another object of the invention is to provide an aligning device with adjustable pivot means interconnecting two side members whereby the side members may be angularly adjusted with respect to each other.

Another object of the invention is to provide an aligning device with side extension members having means for longitudinally adjusting the side extension members relative to the pivot means which interconnect them.

Another object of the invention is to provide an aligning device with a side extension member having a plurality of side portions with similar construction and having first and second pipe engaging members with surface means to cradle or engage a pipe or similar member.

Another object of the invention is to provide an aligning device for bypassing an obstruction between two members and determining the angular relationship between the members.

Another object of the invention is to provide an aligning device for aligning the holes in a flange at a predetermined angular position with respect to a point on the circumference of a piece of pipe and for squaring the flange with respect to the pipe.

Another object of the invention is to provide a leveling device for determining angular positions with respect to a vertical plane.

Another object of the invention is to provide a leveling device for determining if and when a pipe or similar member resides in a horizontal plane.

Another object of the invention is to provide a two-part mechanism for aligning first and second pieces of pipe with the two parts being readily separated from each other and with one of the parts being movable to various angular positions.

Another object of the invention is to provide a device for aligning two pieces of pipe at substantially 90 degrees with respect to each other which device includes first and second side members connected to each other by an integral connecting assembly which includes first and second connection members integrally connected together and to the side members to form an unobstructed corner.

Other objects and a fuller understanding of the invention may be had by referring to the following detailed description and claims, taken in conjunction with the accompanying drawings, in which:

Figures 1, 2, 6:
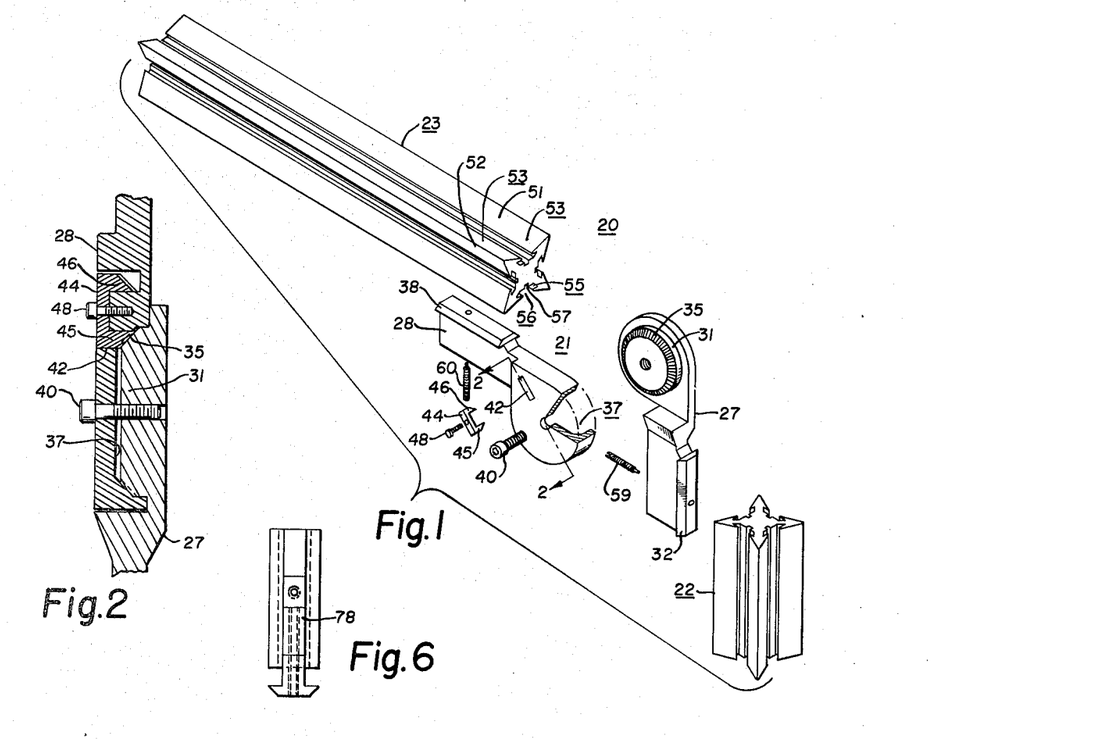
FIGURE 1 is an exploded isometric view partially in section of the aligning device of the present invention.
FIGURE 2 is a fragmentary view in section taken along the line 2—2 of FIGURE 1.
FIGURE 6 is a view taken along the line 6—6 of FIGURE 5 showing a corner block member without showing the side extension member to which it is secured.

Referring to FIGURE 1, the aligning device 20 includes generally a hinge block assembly 21 and first and second side extension members 22 and 23, respectively. The side extension members 22 and 23 have been shown in FIGURE 1 as being of varying longitudinal extent and it should be readily recognized that they may be both made of equal length or of varying length. The basic construction of each of the side extension members is substantially identical.

The hinge block assembly 21 comprises first and second relatively rotatable block members 27 and 28, respectively. The first block member 27 has a generally circular pivot member 31 at one end portion thereof and has a flanged portion 32 at the other end portion thereof. The pivot member 31 is provided with a plurality of serrations 35 which extend around the circumference thereof. The second block member 28 has wall means defining a generally circular socket 37 at one end portion thereof and a flange portion 38 similar to the flanged portion 32 on the other block member. The pivot member 31 fits in the socket 37 in the assembled device and a pivot member 40 secures the pivot member 31 within the socket 37 and permits relative rotational movement between the first and second block members. The second block member 28 has an opening 42 which extends from a side of the block opposite the socket into the socket and adjacent the serrations 35 on the pivot member 31. A locating member 44 having first and second fingers 45 and 46, respectively, resides in the opening 42 (FIGURE 2). Each of the fingers 45 and 46 have serrations thereon which are adapted to alternately intermesh with the serrations 35 on the pivot member 31 depending on how the locating member 44 is placed in the opening 42, to secure the first and second block members from rotative movement with respect to each other. Means which include a bolt 48 is provided for securing the locating member into tight engagement with the pivot member 31. The first and second block members are provided with suitable marks (not shown) to indicate their relative rotational positions with respect to each other. The serrations on the first finger 45 of the locating member 44 are offset with respect to the serrations on the second finger 46, thereby providing a fractional angular adjustment between the block members which varies depending on which finger is used to engage the pivot member 31.

Figures 3, 4:
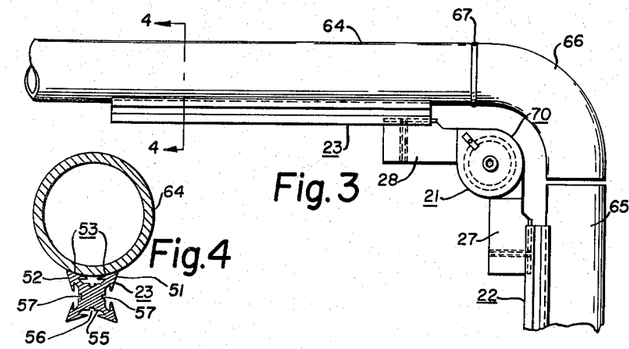
FIGURE 3 is a side elevational view of the aligning device, illustrating its use in aligning two pieces of pipe which are to be interconnected by a 90 degree elbow.
FIGURE 4 is a view taken along the line 4—4 of FIGURE 3.

Each of the first and second side extension members 22 and 23, respectively, comprises four side portions which are of substantially identical construction so that these side portions may be used interchangeably. Each of the side portions is provided with first and second pipe engaging members 51 and 52, respectively, each of which have surface means 53 to cradle the piece of pipe which is to be aligned. With the use of two pipe engaging members, the side extension member can be quite easily located parallel to the piece of pipe which it engages, which is, of course, essential if there is to be any accuracy in the alignment of two pieces of pipe. The engagement of the surface means 53 with the piece of pipe is best seen in FIGURE 4 of the drawings. Each of the first and second pipe engaging members has wall means 55 which define a channel 56 which extends longitudinally of the side extension member. These wall means also provide a key-way 57 located at the base of the channel and which extends generally in the same longitudinal direction.

The flange portion 32 of the first block member 27 resides in a channel 56 of the first side extension member and a screw 59 extends through the first block member and into the key-way 57 at the base of the same channel within which the flange portion 32 resides. The first block member 27 and the first side extension member 22 are included in the first side member. By the same token, the flange portion 38 of the second block member resides in a channel of the second side extension member 23 and a screw 60 extends into the key-way of the second side extension member to fixedly hold them together. The second side extension member is included in the second side member and the second block member 28 is included as part of an interconnecting member or means. It will thus be seen that the side extension members are capable of a wide range of longitudinal adjustment with respect to the block member with which it cooperates and the provision of the key-way insures that the surface of the channel within which the respective flanged portions reside will not become burred and thus prevent good sliding movement. Any burring which takes place is done down in the key-way. The pivot and socket arrangement of the two block members along with the locating member provides a unique method of varying the angular positioning of the side extension members and thus provides a wide range of use for the device.

One of the many uses of the aligning device hereinabove described is illustrated in FIGURE 3. FIGURE 3 shows first and second straight runs of pipe 64 and 65 which are to be interconnected by a 90 degree elbow 66. The elbow 66 is illustrated as being already attached to the pipe 64 by a weld 67. Since the second run of pipe 65 is to be disposed 90 degrees from the first run of pipe, the aligning device 20 is adjusted so that the first and second side extension members 22 and 23 are 90 degrees apart. The side extension members may also be longitudinally adjusted with respect to the block members with which they cooperate as hereinabove described. It will thus be seen that the aligning device can be used to quickly and readily align two runs of pipe before they are connected together or if they have already been fixedly attached the device may be used to measure the angular relationship between the two pipe runs. The hinge block assembly 21 is provided with or includes wall means 70 which serve to bypass or avoid the connection means or corner which is formed by the elbow 66 and the places where the elbow is welded to the respective runs of pipe. In comparing this device to an analogous structure which might be used for this purpose it can be said that the present device avoids the mechanical vertex which would collide or otherwise interfere with the curvature of the elbow and would prevent alignment or measurement between the two pipe runs.

Figure 5:
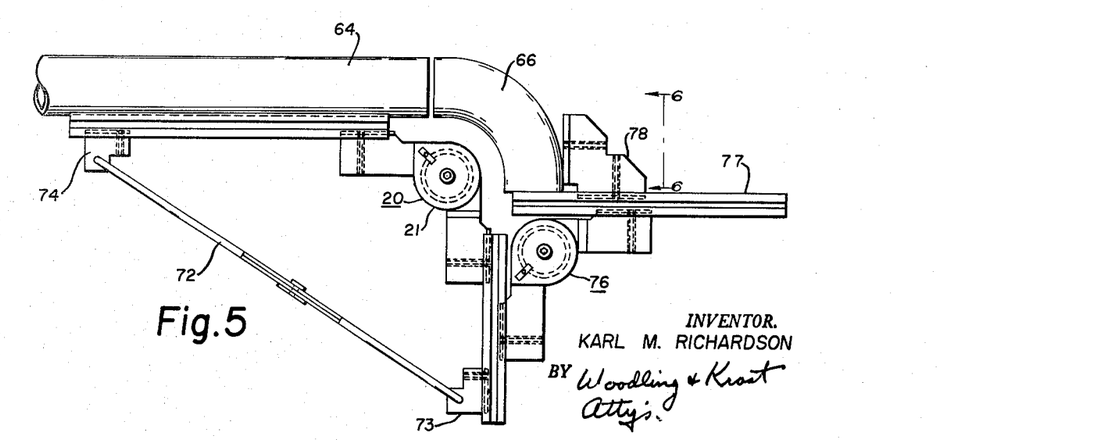
FIGURE 5 is a side elevational view illustrating the aligning device in its function of aligning a 90 degree elbow to a straight run of pipe.

FIGURE 5 illustrates a modification of the device shown in FIGURES 1 and 3 and illustrates how the device may be utilized to align a 90 degree elbow which is to be connected to a straight run of pipe. For the sake of clarity, the same reference numerals have been applied to FIGURE 5 as have been used in FIGURE 3 where no changes in structure have been encountered. Accordingly, the run of pipe 64 is to be aligned with the elbow 66 so that the two may be welded or otherwise suitably connected together. The aligning device 20 in this modification has been provided with a supporting brace 72 which is, connected at opposite end portions to first and second blocks 73 and 74. The blocks 73 and 74 are provided with a flanged construction similar to the flanges 32 and 38 of the block members 27 and 28. They are therefore capable of interfitting and sliding in the channels 56 as are the flanges 32 and 38. The supporting brace 72 is capable of being longitudinally adjusted. In FIGURE 5, a second hinge block assembly 76 has been utilized, in addition to the hinge block assembly 21, and an additional side extension member 77 has been shown. The side extension member 77 is similar in construction to side extension members 22 and 23. One end of the elbow 66 resides upon the pipe engaging members 51 and 52 of the side extension member 77 and a corner block member 78 slides in the channel 56 of the side extension member 77 and abuts the elbow 66 to hold it in position so that it may be welded to the run of pipe 64.

Figures 7, 8, 9, 11:
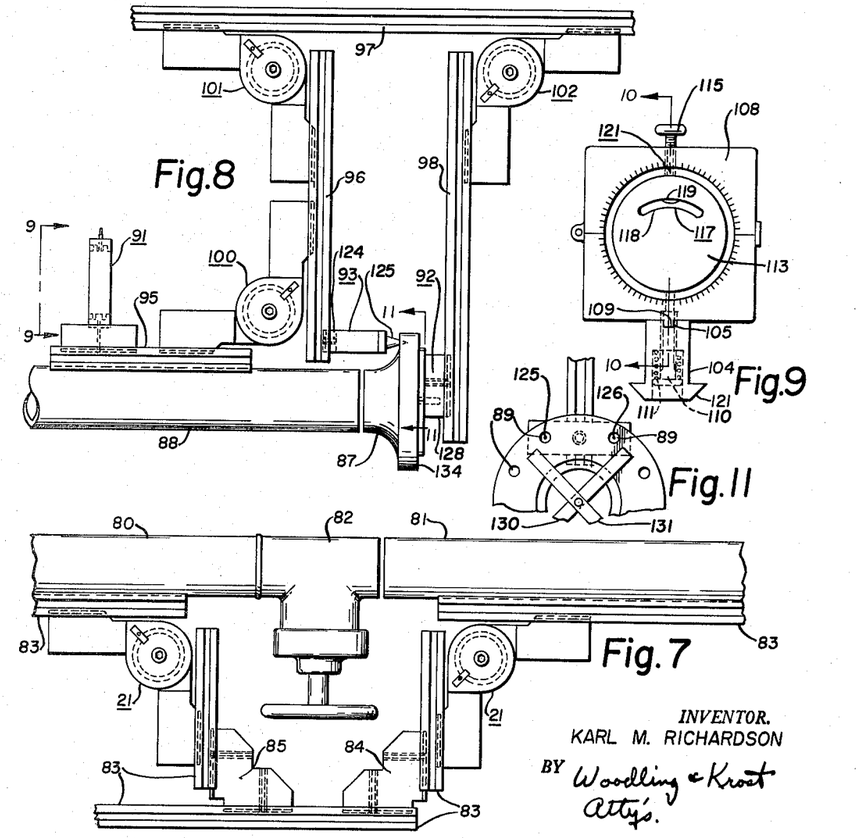
FIGURE 7 is a side elevational view illustrating a modification of the aligning device being used to align two pieces of pipe which are to be interconnected by a valve.
FIGURE 8 is a side elevational view showing the use of the aligning device in its function of squaring and aligning the bolt holes of a flange with respect to a straight run of pipe.
FIGURE 9 is a view taken along the line 9—9 of FIGURE 8.
FIGURE 11 is a view taken along the line 11—11 of FIGURE 8.

FIGURE 7 illustrates a modification of the device shown in FIGURES 3 and 5 and shows how the device may be utilized for bypassing a large obstruction between first and second runs of pipe 80 and 81 which are to be interconnected by means of a valve 82. In this illustration two hinge block assemblies 21 have been shown and indicated by the same reference numerals since they are identical and the five side extension members which have been shown have been indicated by the same reference numeral 83 for more clarity and it is to be understood that they are of the same construction as the side extension members 22, 23 and 77 which have been described hereinabove. The two side extension members 83 which extend vertically in FIGURE 6 and which are joined together by the horizontal extension member 83 are interconnected by corner blocks 84 and 85 which are of identical construction to the corner block 78 which is shown in FIGURE 5. These side extension members and the corner blocks provide wall means or construction means for bypassing the connecting valve 82 so that the two runs of pipe 80 and 81 may be perfectly aligned.

FIGURES 8 through 11 illustrate the aligning device as being used to square a flange 87 with a run of pipe 88 and to align bolt holes 89 in the flange at a predetermined angular position with respect to a point on the circumference of the pipe 88. This mechanism shown in FIGURE 8 includes generally a leveling device 91, a flange squaring device 92, and a two-holing device or aligning finger member 93. It should be pointed out at the outset that the problem to be solved by the device illustrated in FIGURE 8 stems from the fact that the run of pipe 88 would usually have a flange similar to flange 87 or other fiting to be welded or otherwise suitably secured to the other end of the pipe 88, not shown herein. The problem is to square up the flange 87 and make certain that the bolt holes 89 therein are in alignment with the bolt holes on the flange which is located on the other end of the pipe 88. The four side extension members which have been illustrated in FIGURE 7 are identical in construction with the extension members 22, 23, 77 and 83 which have been used hereinabove in describing FIGURES 1, 3, 5 and 7. However, for the sake of clarity in the explanation of FIGURE 8, these four side extension members have been indicated by the reference numerals 95 through 98. The hinge block assemblies are also identical in construction with the hinge block assemblies hereinabove described but they will also be designated by different reference numerals; namely, numerals 100 through 102, respectively, so that the operation of the device shown in FIGURE 8 may be more adequately understood. As will be noted, in FIGURE 8, the extension member 95 is connected to the extension member 96 by the hinge block assembly 100 and the extension member 96 is in turn connected to extension member 97 by hinge block assembly 101. Extension member 97 is connected to member 98 by hinge block assembly 102. In this illustration, each extension member extends substantially at right angles to the adjacent extension member.

Figure 10:
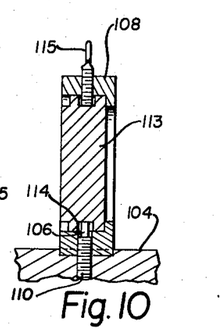
FIGURE 10 is a view taken along the line 10—10 of FIGURE 9.

The leveling device 91 shown in detail in FIGURES 9 and 10 includes a mounting block 104 which has first and second crossed grooves 105 and 106, respectively, therein. The groove 105 is best shown in FIGURE 9 and the groove 106 is best shown in FIGURE 10. A housing 108 has a raised ridge 109 thereon which is alternately interfittable into one of the crossed grooves to prevent turning movement between the mounting block 104 and the housing 108. The mounting block 104 is suitably drilled and a screw 110 extends through the mounting block and is secured to the housing 108. A spring 111 is interposed between the mounting block 104 and the head of the screw 110 and permits sufficient longitudinal movement between the housing 108 and the mounting block 104 when sufficient force is supplied to overcome the spring so that the housing and mounting block may be turned relative to each other and the ridge 109 may be interfitted into a different crossed groove in the mounting block 104. An annular block 113 having a groove 114 on the periphery thereof resides in the housing 108 with the end of screw 110 and with another screw 115 extending in the groove 114 to retain the annular block within the housing and when screw 115 is tightly engaged with the base of the groove 114, rotative movement of the annular block is prevented. Level means 117 are carried by the annular block and includes generally a transparent shell 118 partially filled with liquid, such as alcohol, which provides a leveling bubble 119. The mounting block 104 is provided with a flange 121 similar to the flanges 32 and 38 in FIGURE 1 which enables the leveling device to be secured and mounted to the side extension member 95. Indication means 121 which comprise suitable marks upon the housing 108 and the annular block 113 indicate relative rotational movement between these two members.

The two-holing device 93 includes generally a mounting block 124 having a flange similar to the flange 121 on the mounting block 104 and is connected to the side extension member 96. This two-holing device comprises first and second fingers 125 and 126 which are adapted to extend into predetermined holes 89 best seen in FIGURE 11. The flange squaring device 92 includes a mounting block 128 similar to mounting blocks 124 and 104 to which are secured crossed squaring members 130 and 131. These crossed squaring members are adapted to engage a face 134 of the flange 87 to align this face generally normal to the run of pipe 88. Referring to FIGURE 8, it will be readily apparent that when the leveling device is in the position shown, the leveling bubble will be in the position shown in FIGURE 9. If the leveling device as a whole is rotated about a point corresponding to the axis of the run of pipe 88, then the leveling bubble would no longer reside in the position shown in FIGURES 8 and 9. To get the leveling bubble 119 into its uppermost position after the device has been rotated, it would be necessary to rotate the annular block 113 relative to the housing 108 until this were accomplished. The indication means 121 would then indicate how far the leveling device as a whole has been moved about the circumference of the pipe 88.

Accordingly, to utilize the device shown in FIGURE 8, the device would be turned opposite to the position shown in FIGURE 8 so that the fingers 125 and 126 of the two holing devices would extend into the holes in the flange which has already been affixed at the left end of the pipe 88 and which has not been shown in FIGURE 8. The leveling device would then be adjusted by rotating the block 113 in the housing 108 until the leveling bubble had acquired its uppermost position within the shell 118. This would then fix the positioning of the device and it would then be turned to the position shown in FIGURE 8 and the holes in the flange 87 would be aligned with the fingers 125 and 126. The leveling bubble 119 would indicate when the device was in the correct angular position on the surface of the pipe 88. The crossed squaring members 130 and 131 would of course be brought into engagement with the face of the flange 87 and the correct positioning of the flange relative to the pipe 88 would be assured. The flange would then be secured to the pipe 88 by welding or other suitable means. The positioning of the run of pipe 88 relative to a horizontal plane may also be determined by turning the housing 108 90 degrees relative to the position in which it is shown in FIGURE 8. This will indicate whether the run of pipe 88 is horizontal or if not, its degree of deviation.

Figures 12, 13, 14, 15:
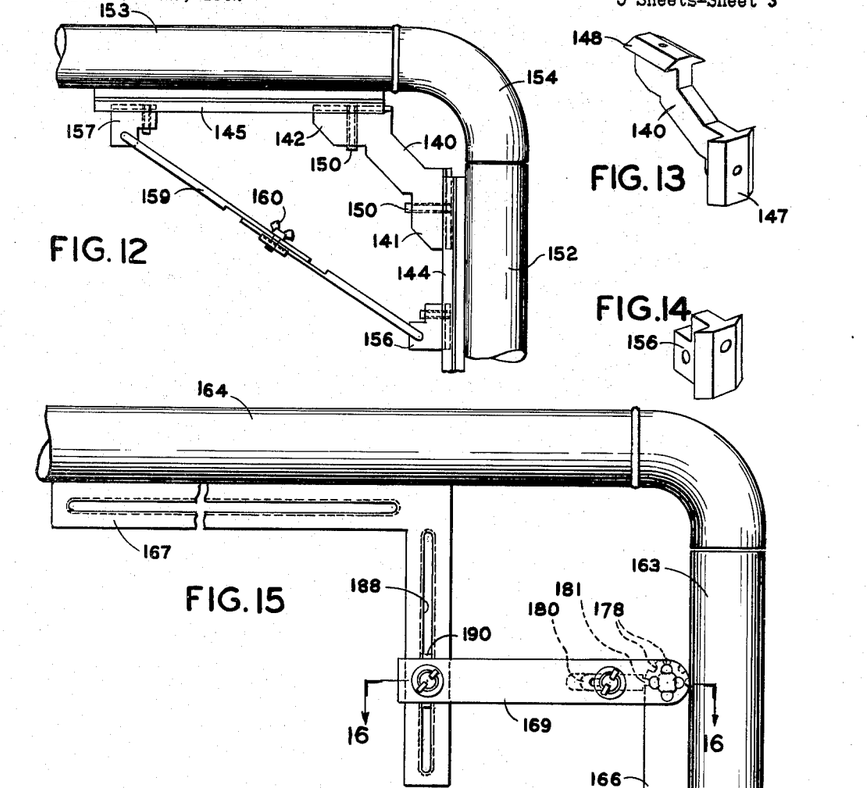
FIGURE 12 is a side elevational view illustrating a modification of the aligning device.
FIGURES 13 and 14 are isometric views of the blocks shown in FIGURE 12.
FIGURE 15 is a side elevational view illustrating another modification of the aligning device.

FIGURE 12 is a side elevational view of a modified form of the aligning device shown in FIGURE 5. It will be noted that this form of the aligning device includes in combination a block member 140 which has first and second end portions 141 and 142, respectively, which are generally disposed 90 degrees from each other. First and second side members 144 and 145 are secured respectively to the first and second end portions of the block member 140. The block member 140 is better seen in detail in FIGURE 13 and as will be noted, includes first and second guided members 147 and 148, respectively. The first and second side members 144 and 145 may be basically of the same construction as the side members 22 and 23 shown in FIGURE 1. The first and second side members are provided with guideways as are the side members shown in FIGURE 1 and these guideways receive the guided members 147 and 148. Screws 150 extend through holes in the block member and bear against the side members to hold the side members in a longitudinally adjusted position with respect to each other. It will be noted that the side member 144 bears against a piece of pipe 152 whereas side member 145 bears against a piece of pipe 153. The device as shown aligns the pipes 152 and 153, 90 degrees with respect to each other whereby the elbow 154 may be appropriately secured to each of the pieces of pipe. In order to insure rigidity first and second supplemental block members 156 and 157, respectively, are provided in the first and second side members and are secured in position in much the same manner as the side members are secured to the block member 140. The supplemental block member is shown in more detail in FIGURE 14 of the drawing. Extending between the supplemental block members 156 and 157 is a support member 159 which includes two parts which provides for adjustment in the length thereof by means of a screw and washer member 160.

Figure 16:
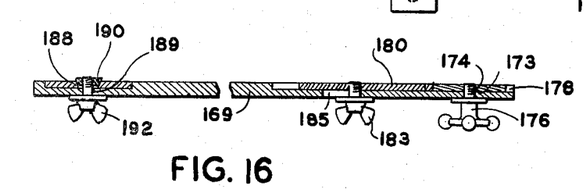
FIGURE 16 is a view taken generally along the line 16—16 of FIGURE 15.

FIGURES 15 and 16 show a still further modification of a device for aligning first and second pieces of a pipe 163 and 164 at a predetermined angle with respect to each other. This device, like the previous device, includes in combination first and second side members 166 and 167 each of which is provided with wall means which are in engagement with the first and second pieces of pipe respectively as shown in FIGURE 5. An interconnecting member 169 is provided for connecting the first and second side members together and this interconnecting member is provided with first and second end portions 170 and 171, respectively. Wall means 173 are provided in the first end portion of the interconnecting member and define an opening therethrough and a matching opening 174 having threads therein is provided in an end portion of the first side member. The first side member is secured to the first end portion of the interconnecting member by means of a combined pivot and locking member 176 which extends through the opening 173 and the threads thereon engage the thread opening in the first end portion of the side member. As a result, the two are pivotally connected together and upon tightening of the pivot and locking member 176, the two are secured with respect to each other. The above referred to end portion of the first side member is also provided with a plurality of angularly spaced notches 178. A locating member 180 is mounted in a guide on the interconnecting member and is adapted for movement toward and away from the above referred to notches. The locating member has an end portion 181 engageable with the notches and when in engagement therewith serves as a means for additionally locking the two members with respect to each other and at a predetermined angle. Means 183 are also provided for locking the locating member in position and this means includes, as will be noted from FIGURE 16, a wing-type thumb screw which extends through an opening 185 in the interconnecting member and on into the locating member. Upon tightening of the screw 183, the locating member is locked in position and when loosened the locating member may be moved from the position seen in FIGURES 15 and 16 to enable an operator to move the interconnecting and first side member with respect to each other when the pivot and locking member 176 is also loosened.

Wall means 188 are provided in the second side member and define a generally wedge-shaped opening as will be best seen in FIGURE 16. This wedge-shaped opening extends longitudinally along the second side member. Wall means 189 are provided in the second end portion of the interconnecting member. A wedge-shaped locking member 190 is adapted to fit into the wedge-shaped opening 188 and screw means 192 extend through the opening 189 into the wedge-shaped locking member whereby the interconnecting member and the second side member may be fixedly secured with respect to each other. Upon loosening of the screw means 192, the second side member may be longitudinally adjusted to provide for greater or lesser distances between members to be aligned, for example, the pipes 163 and 164 shown in FIGURE 15.

Figure 17:
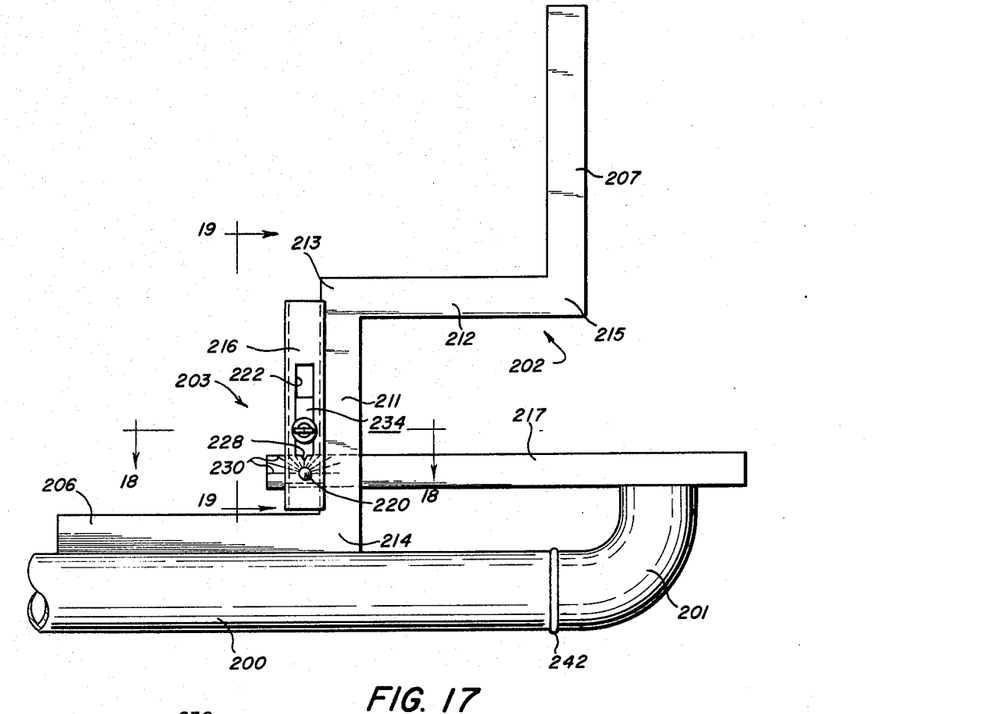
FIGURE 17 is a side elevational view illustrating another modification of the aligning device.
Figure 18:
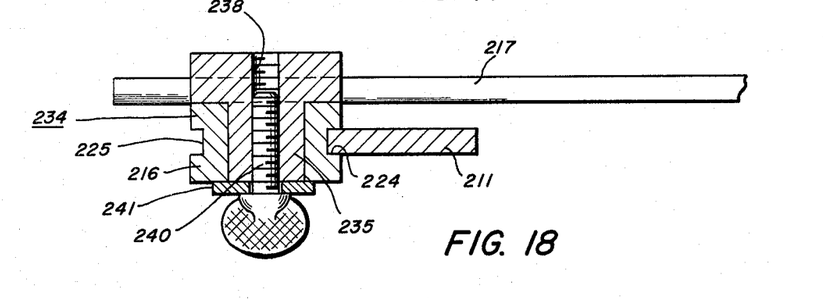
FIGURE 18 is a view taken generally along the line 18—18 of FIGURE 17.
Figures 19, 20:
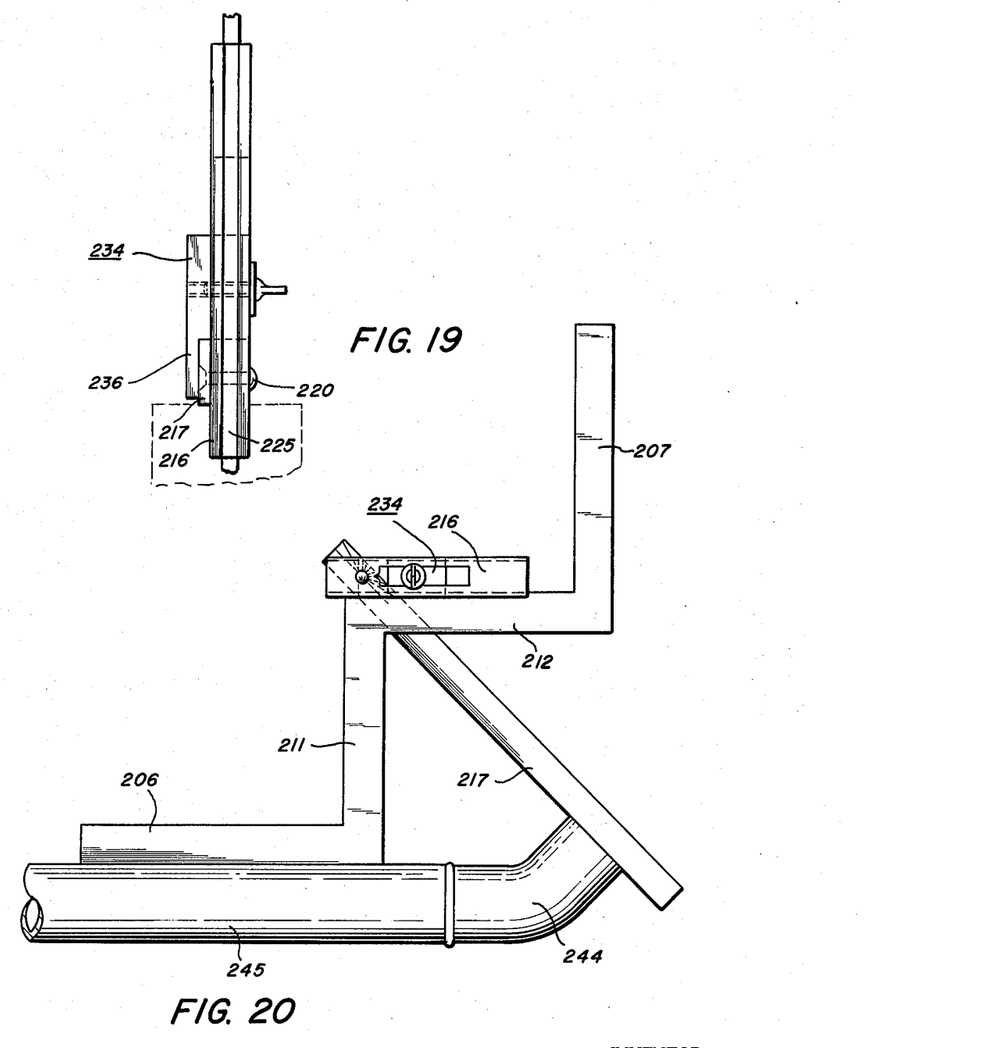
FIGURE 19 is a view taken generally along the line 19—19 of FIGURE 17.
FIGURE 20 is a view similar to FIGURE 17 but showing the device in a different position.

FIGURES 17, 18 and 19 illustrate a still further modification of the device constructed under the teachings of the present invention. The device as shown in these figures includes a two-part mechanism for aligning first and second pieces of pipe at a predetermined angle with respect to each other. The two pieces of pipe illustrated in the present discussion are indicated by the reference numerals 200 and 201. The two-part mechanism may be said to include what is generally referred to as an engagement assembly 202 and an alignment assembly 203. The engagement assembly comprises first and second side members 206 and 207 respectively, each of which has wall means which are adapted to engage a piece of pipe. In FIGURE 17 the side member 206 is the only one in engagement with a pipe member, namely pipe 200. An integral connecting assembly is interposed between the side members 206 and 207 for fixedly connecting the same together so that they extend at substantially a 90 degree angle with respect to each other. This connecting assembly comprises first and second connection members 211 and 212, respectively, which are integrally connected to each other at one of their ends as at 213 and this locates the connection members so that they form a 90 degree corner or in other words so that they extend at substantially a 90 degree angle with respect to each other. The other end of the first connection member is integrally connected as at 214 to an end of the first side member 206 to locate these two members at substantially a 90 degree angle with respect to each other or in other words so that they form substantially a 90 degree corner. The other end of the second connection member is integrally connected as at 215 to an end of the second side member 207 to locate these two members at substantially a 90 degree angle with respect to each other. It will be noted from observing FIGURE 17 that the second side member 207 extends away from the 90 degree corner formed at 215 so as to leave this corner unobstructed. In other words, the general area located immediately below the connection member 212 and immediately to the right of the connection member 211 is basically unobstructed.

The alignment assembly 203 comprises first and second alignment members 216 and 217 respectively. Pivot means 220 serve to pivotally connect the first and second alignment members together. This pivot is of such construction that under unlocked conditions (the locked condition will be discussed hereinafter), the alignment members 216 and 217 may be freely moved angularly with respect to each other. The first alignment member 216 is provided with wall means which serve to define a rectangularly shaped opening 222 which extends therethrough. Additional wall means serve to define rectangularly shaped grooves 224 and 225 which extend along the edges of the first alignment member (see FIGURE 18). Wall means also define a V-shaped notch 228 at one end of the rectangularly shaped opening. A plurality of angle marks 230 are located on the second alignment member and these marks originate from or have as their point of origin the pivot means 220. The purpose of the angle marks 230 is to indicate the position of the alignment members 216 and 217 relative to each other and this of course is accomplished or observed by a user of the device when one of the angle marks extends through the V of the V-shaped notch 228.

One of the grooves 224 or 225 of the first alignment member is engageable with one of the first and second connection members 211 and 212 to position the two in parallel relationship. Specifically in FIGURES 17 and 18 it will be seen that the groove 224 interfits with the connection member 211 and this aligns 211 and 216 in parallel relation. The two alignment members 216 and 217 are provided with a locking mechanism for holding the two in a fixed angular relationship with respect to each other when desired, and this locking mechanism comprises a block member 234 which has a portion 235 which is of a width to fit in the rectangularly shaped opening 222 in the first alignment member 216. The block member also has a lip portion 236 (FIGURE 19) which is engageable with a side of the second alignment member 217 which is opposite the first alignment member 216. A threaded opening 238 is provided in the block member and a screw member 240 is located in the threaded opening and a washer 241 spans the rectangularly shaped opening 222 whereupon tightening of the screw member 240, the alignment members are held fast together by the action of the lip portion 236 on the one end and the washer 241 on the other end serving to squeeze the alignment members together.

In FIGURE 17 the device is illustrated as aligning a straight run of pipe 200 with a pipe 201 which constitutes a 90 degree elbow. The elbow 201 is initially tack-welded to the end of the pipe 200 as at 242 and in an approximate position. The elbow is then accurately lined up by utilizing the present device and positioning the engagement and alignment assemblies 202 and 203 in the positions illustrated in FIGURE 17. The first alignment member 216 can be moved vertically on the first connection member 211 so as to bring the edge of 217 into flat engagement with the upper opening of the elbow 201. When this has been accomplished, the elbow 201 is finish-welded to the pipe 200. It will be appreciated that the engagement assembly can then be utilized to align another piece of pipe at 90 degrees to pipe 200 by bringing the other piece of pipe into engagement with the second side member 207.

FIGURE 20 is an illustration of the same device which is shown in FIGURE 17, however, in a different position to properly align a 45 degree elbow 244 with a straight run of pipe 245. To accomplish this, the angular positioning between alignment members 216 and 217 is changed by loosening the screw member 240 and moving the two members to the position shown in FIGURE 20. It will be appreciated that the block member must be shifted slightly away from the pivot means 220 in order to take up for the angular movement of the two members 216 and 217 and of course after this the screw member is retightened. The rectangular groove 224 is moved into engagement with the upper edge of the second connection member 212 as shown and then the alignment member is slid along the second connection member 212 until the end of alignment member 217 opposite the pivot means flatly engages the end of the 45 degree elbow 244. As before, a tack-weld is utilized to initially hold the two pieces of pipe together and when they have been accurately aligned, the two are finish-welded together.

It will also be understood that the leveling device of the present invention might be used in many ways for determining angular positions about the circumference of a pipe or other similar objects.

It will thus be seen that the aligning and leveling device establishes the holes in the flange at predetermined angular positions with respect to the run of pipe and also accurately squares the flange with respect to the pipe. With the use of this device the angular positions about the circumference of the pipe are quite easily determined and it is also quite easily determined whether the pipe resides in a horizontal plane or not. It will thus be seen that the device shown and illustrated in FIGURE 1 is capable of many modifications and adaptations as has been herein shown and described and its use in squaring and aligning a flange for subsequent connection to a run of pipe is only one of the many adaptations for which it may be used.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. A device for aligning first and second pieces of pipe including a hinge block assembly and first and second side extension members, said hinge block assembly comprising first and second relatively rotatable block members, said first block member having a generally circular pivot member at one end portion thereof and a flanged portion at another end portion thereof, said pivot member having serrations on a circumferential portion thereof, said second block member having a generally circular socket at one end portion thereof and a flanged portion at another end portion thereof, pivot means securing said pivot member of said first block member in said socket of said second block member, said second block member having an opening extending from a side opposite said socket into said socket, a locating member having first and second fingers thereon and residing in said opening in said second block member, each said fingers having serrations thereon adapted to alternately intermesh with said serrations on said pivot member to secure said first and second block members from rotative movement with respect to each other, said serrations on said first finger being offset with respect to said serrations on said second finger, means securing said locating member in said opening in said second block member, each said first and second side extension members comprising four side portions, each said side portion having first and second pipe engaging members having surface means to cradle said pipe to be aligned, each said first and second pipe engaging members having wall means defining a longitudinally extending channel, a key-way located at the base of said channel and extending in said same longitudinal direction, said flange portion of said first block member residing in said channel of said first side extension member, screw means extending through said first block member and into said key-way of said first side extension member to fixedly secure them together, said flange portion of said second block member residing in said channel of said second side extension member, and screw means extending through said second block member and into said key-way of said second side extension member to fixedly secure them together.

2. A device for determining the angular relationship between first and second pieces of pipe including a hinge block assembly, and first and second side members, said hinge block assembly comprising first and second relatively movable block members, said first block member having a generally circular pivot member at one end portion thereof and a side member connector portion at another end portion thereof, said pivot member having serrations on a circumferential portion thereof, said second block member having wall means defining a generally circular socket for reception of said pivot member at one end portion thereof and a side member connector portion at another end portion thereof, said second block member having an opening extending therethrough and into said socket adjacent said serrations on said pivot member, each said side member connector portion of said first and second block members having a flange thereon, each said first and second side members comprising first, second, third and fourth side portions, each said side portion having first and second pipe engaging surface portions and having a channel extending lengthwise thereof substantially complementary with said flange on each said side members for receipt of said flange therein, a key-way extending in said channel, screw means extendable through each said side member connector portion and into said key-way to secure said first and second side members with respect to said first and second block members respectively, pivot means pivotally connecting said pivot member within said socket, a locating member having first and second fingers with serrations thereon, corresponding serrations on said first and second members being angularly offset with respect to each other, and means to secure said locating member to said second block member with one of said first and second members thereof extending in said opening with the serrations thereon intermeshing with the serrations on said pivot member to prevent angular movement of said first and second block members relative to each other.

3. A device for aligning first and second pieces of pipe including a hinge block assembly and first and second side extension members, said hinge block assembly comprising first and second relatively rotatable block members, said first block member having a pivot member at one end portion thereof and a flanged portion at another end portion thereof, said second block member having a socket at one end portion thereof and a flanged portion at another end portion thereof, pivot means securing said pivot member of said first block member in said socket of said second block member, said second block member having an opening extending from a side opposite said socket into said socket, a locating member residing in said opening in said second block member and engaging said pivot member to secure said first and second block members from rotative movement with respect to each other, means securing said locating member in said opening in said second block member, each said first and second side extension members comprising first and second pipe engaging members having surface means to cradle respective pieces of pipe to be aligned, wall means on said extension members defining a longitudinally extending channel, said flange portion of said first block member residing in said channel of said first side extension member, means fixedly securing said first block member to said first side extension member, said flange portion of said second block member residing in said channel of said second side extension member, and means fixedly securing said second block member to said second side extension member.

4. A device for aligning first and second pieces of pipe which are separated by an irregular obstruction including a first side extension member having first and second pipe engaging members engaging said first piece of pipe at respective portions on the periphery of said first piece of pipe and having a longitudinally extending channel, a first hinge block assembly including first and second block members, said first block member of said first hinge block assembly having a flange portion residing in said channel of said first side extension member, first pivot means pivotally interconnecting said first and second block member of said first hinge block assembly, said second block member of said first hinge block assembly having a flange portion, a second side extension member having a longitudinally extending channel, said flange portion of said second block member of said first hinge block assembly residing in said channel of said second side extension member, a first corner block member having first and second flange portions displaced substantially at right angles to each other, said first flange portion of said first corner block residing in said channel of said second side extension member, a third side extension member having a longitudinally extending channel, said second flange portion of said first corner block residing in said channel of said third side extension member, a second corner block member having first and second flange portions displaced substantially at right angles to each other, said first flange portion of said second corner block member residing in said channel of said third side extension member, a fourth side extension member having a longitudinally extending channel, said second flange portion of said second corner block member residing in said channel of said fourth side extension member, a second hinge block assembly including first and second block members, said second block member of said second hinge block assembly having a flange portion residing in said channel of said fourth side extension member, and pivot means pivotally interconnecting said first and second block members of said second hinge block assembly, and a fifth side extension member having first and second pipe engaging members engaging said second piece of pipe at respective portions on the periphery of said second piece of pipe and having a longitudinally extending channel, said flange portion of said first block member of said second hinge block assembly residing in said channel of said fifth side extension member.

5. A device for aligning and squaring a flange having bolt holes therein, with respect to a length of pipe to which it is to be secured including a first hinge block assembly, a first side extension member having wall means for engaging said length of pipe, means adjustably securing said first side extension member to said first hinge block assembly, a leveling device carried by said first side extension member and comprising a housing, an annular level member rotatably carried by said housing and having a leveling bubble therein to indicate the positioning of said first side extension member relative to the surface of said length of pipe and to indicate the positioning of said length of pipe relative to a horizontal plane, a second side extension member extending generally at a right angle to said first side extension member, means adjustably securing said second side extension member to said first hinge block assembly, an aligning mechanism carried by said second side extension member, said mechanism including first and second aligning fingers adapted to reside in predetermined bolt holes in said flange to fix the angular relationship of said flange relative to said length of pipe, a second hinge block assembly, means adjustably securing said second hinge block assembly to said second side extension member, a third side extension member, means adjustably securing said third side extension member to said second hinge block assembly and at substantially a right angle to said second side extension member, a third hinge block assembly, means adjustably securing said third hinge block assembly to said third side extension member, a fourth side extension member, means adjustably securing said fourth side extension member to said third hinge block assembly and at substantially a right angle to said third side extension member, and a flange squaring device carried by said fourth side extension member and comprising first and second crossed members extending normal to said length of pipe and engageable with the face of said flange to square said flange with said pipe.

6. A device for aligning and squaring a flange having bolt holes therein, with respect to a length of pipe to which it is to be secured including a first hinge block assembly, a first side extension member having wall means for engaging said length of pipe, means adjustably securing said first side extension member to said first hinge block assembly, a second side extension member extending generally at a right angle to said first side extension member, means adjustably securing said second side extension member to said first hinge block assembly, an aligning mechanism carried by said second side extension member, said mechanism including first and second aligning fingers adapted to reside in predetermined bolt holes in said flange to fix the angular relationship of said flange relative to said length of pipe, a second hinge block assembly, means adjustably securing said second hinge block assembly to said second side extension member, a third side extension member, means adjustably securing said third side extension member to said second hinge block assembly and at substantially a right angle to said second side extension member, a third hinge block assembly, means adjustably securing said third hinge block assembly to said third side extension member, a fourth side extension member, means adjustably securing said fourth side extension member to said third hinge block assembly and at substantially a right angle to said third side extension member, and a flange squaring device carried by said fourth side extension member and comprising first and second crossed members extending normal to said length of pipe and engageable with the face of said flange to square said flange with said pipe.

7. A device for determining the angular relationship between first and second members including in combination a first side member having wall means engageable with said first member, a second side member having wall means engageable with said second member, an interconnecting member connecting said first side member to said second side member, pivot means including a portion of said interconnecting member and a portion of said first side member for angularly moving said first and second side members relative to each other, said pivot means including a locating member carried by said interconnecting member and engageable with said first side member to secure said interconnecting and first side member at a desired angle with respect to each other, longitudinal adjustment means between said interconnecting and second side members, said longitudinal adjustment means including wall means defining a guideway in said second side member and a guide member residing in said guideway and supported by said interconnecting member, and means for fixedly holding said interconnecting and second side members in a longitudinally adjusted position.

8. A device for determining the angular relationship between first and second members including in combination a first side member having wall means engageable with said first member, a second side member having wall means engageable with said second member, an interconnecting member connecting said first side member to said second side member, pivot means including a portion of said interconnecting member and said first side member for angularly moving said first and second side members relative to each other, said pivot means including a locating member carried by one of said interconnecting and first members and engageable with the other of said interconnecting and first side members to secure said interconnecting and first side member at a desired angle with respect to each other, longitudinal adjustment means between said interconnecting and second side member, said longitudinal adjustment means including wall means defining a guideway in one of said interconnecting and second side members and a guide member residing in said guideway and supported by the other of said interconnecting and second side members, and means for fixedly holding said interconnecting and second side member in an adjusted position.

9. A device for determining the angular relationship between first and second members including in combination a first side member having wall means engageable with said first member, a second side member having wall means engageable with said second member, an interconnecting member connecting said first side member to said second side member, pivot means including a portion of said interconnecting member and said first side member for angularly moving said first and second side members relative to each other, said pivot means including a locating member carried by said interconnecting member and engageable with said first side member to secure said interconnecting and first side member at a desired angle with respect to each other, longitudinal adjustment means between said interconnecting and second side members, said longitudinal adjustment means including wall means defining a guideway in said second side member and a guide member residing in said guideway and supported by said interconnecting member.

10. A device for determining the angular relationship between first and second members including, in combination, a first side member having wall means engageable with said first member, a second side member having wall means engageable with said second member, an interconnecting member, pivot means pivotally connecting one end portion of said interconnecting member to one end portion of said first side member whereby same may be moved angularly relative to each other, a locating member carried by said interconnecting member and engageable with said first side member to secure said interconnecting and first side member at a desired angle with respect to each other, longitudinal adjustment means interconnecting the other end portion of said interconnecting member to one end portion of said second side member, said longitudinal adjustment means including wall means defining a guideway in said second side member and a guide member residing in said guideway and supported by said interconnecting member, and means for fixedly holding said interconnecting and said second side members in a longitudinally adjusted position.

11. A device for determining the angular relationship between first and second members including, in combination, a first side member having wall means engageable with said first member, a second side member having wall means engageable with said second member, an interconnecting member, pivot means pivotally connecting one end portion of said interconnecting member to one end portion of said first side member whereby same may be moved angularly relative to each other, and means for securing said interconnecting and first side member at a desired angle with respect to each other.

12. A device for determining the angular relationship between first and second members including, in combination, a first side member having wall means engageable with said first member, a second side member having wall means engageable with said second member, an interconnecting member, pivot means pivotally connecting one end portion of said interconnecting member to one end portion of said first side member whereby same may be moved angularly relative to each other, longitudinal adjustment means interconnecting the other end portion of said interconnecting member to one end portion of said second side member, said longitudinal adjustment means including wall means defining a guideway in one of said second side and interconnecting members and a guide member residing in said guideway and supported by the other of said interconnecting and second side members, and means for fixedly holding said interconnecting and said second side members in a longitudinally adjusted position.

13. A device for aligning first and second pieces of pipe at a predetermined angle with respect to each other including in combination first and second side members each having wall means for engagement with said first and second pieces of pipe respectively, an interconnecting member for connecting said first and second side members together and having first and second 2nd portions.

wall means defining an opening in first end portion of said interconnecting member, wall means defining a threaded opening in an end portion of said first side member, a combined pivot and locking member extending through said opening in said first end portion of said interconnecting member and having threads on an end thereof threadably engaging said threaded opening in said end portion of said first side member whereby said members are pivotally connected together and upon tightening of said threads said members are locked in a predetermined angular relationship with respect to each other, said end portion of said first side member having a plurality of angularly spaced notches, a locating member mounted in a guide on said interconnecting member for movement toward and away from said notches, said locating member having an end portion engageable with said notches, means for locking said locating member in position, wall means defining a wedge shaped opening in an end portion of said second side member and extending longitudinally thereof, wall means defining an opening in said second end portion of said interconnecting member, a wedge shaped locking member residing in said wedge shaped opening, and screw means extending through said opening in said second end portion of said interconnecting member and into said wedge shaped locking member whereby said interconnecting member and said second side member fixedly secured with respect to each other.

14. A device for aligning first and second members at a predetermined angle with respect to each other including in combination first and second side members each having wall means for engagement with said first and second members respectively, an interconnecting member for connecting said first and second side members together and having first and second end portions, a combined pivot and locking member extending between said first end portion of said interconnecting member and said first side member, said first side member having a plurality of angulary spaced notches, a locating member mounted on said interconnecting member for movement toward and away from said notches, said locating member having an end portion engageable with said notches, means for locking said locating member in position and means connecting said second end portion of said interconnecting member to said second side member whereby the two may be adjusted longitudinally.

15. A two part mechanism for aligning first and second pieces of pipe at a predetermined angle with respect to each other including in combination an engagement assembly and an alignment assembly, said engagement assembly comprising first and second side members each having wall means adapted to engage a piece of pipe, an integral connecting assembly for fixedly connecting said first and second side members at substantially a 90 degree angle with respect to each other, comprising first and second connection members integrally connected to each other at one of their ends to locate said connection members at substantially a 90 degree angle with respect to each other, the other end of said first connection member being integrally connected to an end of said first side member to locate same at substantially a 90 degree angle with respect to each other, the other end of said second connection member being integrally connected to an end of said second side member to locate same at substantially a 90 degree angle with respect to each other, said second side member extending away from the 90 degree corner formed by said first and second connection members so as to leave said corner unobstructed, said alignment assembly comprising first and second alignment members, pivot means pivotally connecting said first and second alignment members together, said first alignment member having wall means defining a rectangularly shaped opening extending therethrough, wall means defining rectangularly shaped grooves extending along the edges of said first alignment member, wall means defining a V-shaped notch in one end of said rectangularly shaped opening, a plurality of angle marks on said second alignment member originating from said pivot means, one of said grooves of said first alignment member engaging one of said first and second connection members to position the two in parallel relationship, a locking mechanism for holding said first and second alignment members in fixed angular relationship with respect to each other comprising a block member having a portion fitting in said rectangularly shaped opening in said first alignment member and having a lip portion engageable with a side of said second alignment member opposite said first alignment member, a threaded opening in said block member, a screw member in said opening and a washer spanning said rectangularly shaped slot whereby upon tightening of said screw member said first and second alignment members are held in fixed angular relationship with respect to each other.

16. A two part mechanism for aligning first and second pieces of pipe at a predetermined angle with respect to each other including in combination an engagement assembly and an alignment assembly, said engagement assembly comprising first and second side members each having wall means adapted to engage a piece of pipe, an integral connecting assembly for fixedly connecting said first and second side members at substantially a 90 degree angle with respect to each other, comprising first and second connection members integrally connected to each other at one of their ends to locate said connection members at substantially a 90 degree angle with respect to each other, the other end of said first connection member being integrally connected to an end of said first side member to locate same at substantially a 90 degree angle with respect to each other, the other end of said second connection member being integrally connected to an end of said second side member to locate same at substantially a 90 degree angle with respect to each other, said alignment assembly comprising first and second alignment members, pivot means pivotally connecting said first and second alignment members together, said first alignment member having wall means defining an opening extending therethrough, wall means defining grooves extending along at least one edge of said first alignment member, said groove of said first alignment member engageable with one of said first and second connection members to position the two in parallel relationship, a locking mechanism for holding said first and second alignment members in fixed angular relationship with respect to each other comprising a block member having a portion fitting in said opening in said first alignment member and having a portion engageable with a side of said second alignment member.

17. A two part mechanism for aligning first and second pieces of pipe at a predetermined angle with respect to each other including in combination an engagement assembly and an alignment assembly, said engagement assembly comprising first and second side members each having wall means adapted to engage a piece of pipe, an integral connecting assembly for fixedly connecting said first and second side members at substantially a 90 degree angle with respect to each other, comprising first and second connection members integrally connected to each other at one of their ends to locate said connection members at substantially a 90 degree angle with respect to each other, the other end of said first connection member being integrally connected to an end of said first side member to locate same at substantially a 90 degree angle with respect to each other, the other end of said second connection member being integrally connected to an end of said second side member to locate same at substantially a 90 degree angle with respect to each other, said alignment assembly comprising first and second alignment members, pivot means pivotally connecting said first and second alignment members together, said first alignment member engageable with one of said first and second connecting members to position the two in parallel relationship, and a locking mechanism for holding said first and second alignment members in fixed angular relationship with respect to each other.

References Cited by the Examiner

UNITED STATES PATENTS

| 304,601 | 9/1884 | Boettcher | 33—95 X |
| 765,300 | 7/1904 | Williams | 33—120 X |
| 954,460 | 4/1910 | Peterson | 33—103 X |
| 1,024,863 | 4/1912 | Myers | 33—94 |
| 1,577,717 | 3/1926 | Hibbard | 33—94 |
| 1,848,527 | 3/1932 | Hickey. | |
| 2,461,783 | 2/1949 | Stark | 33—180 |
| 2,563,599 | 8/1951 | Gardner | 33—174 |

FOREIGN PATENTS 227,622  1/1925  Great Britain.

OTHER REFERENCES

Grunner, Geo.: Article in American Machinist, page 1115, August 6, 1903.

ISAAC LISANN, *Primary Examiner.*